United States Patent
Maley

(10) Patent No.: US 12,128,852 B2
(45) Date of Patent: Oct. 29, 2024

(54) SYSTEM AND METHOD FOR MAINTAINING A POWER SOURCE FOR CONTINUOUS MACHINE SECURITY MONITORING

(71) Applicant: Caterpillar SARL, Geneva (CH)

(72) Inventor: Jacob Charles Maley, Germantown Hills, IL (US)

(73) Assignee: Caterpillar SARL, Geneva (CH)

( * ) Notice: Subject to any disclaimer, the term of this patent is extended or adjusted under 35 U.S.C. 154(b) by 296 days.

(21) Appl. No.: 17/725,389

(22) Filed: Apr. 20, 2022

(65) Prior Publication Data
US 2023/0339429 A1    Oct. 26, 2023

(51) Int. Cl.
| | |
|---|---|
| B60R 25/104 | (2013.01) |
| B60R 25/045 | (2013.01) |
| B60R 25/30 | (2013.01) |
| B60R 25/31 | (2013.01) |
| F02D 17/04 | (2006.01) |
| H02J 7/00 | (2006.01) |
| H02J 7/14 | (2006.01) |

(52) U.S. Cl.
CPC .......... *B60R 25/045* (2013.01); *B60R 25/104* (2013.01); *B60R 25/305* (2013.01); *B60R 25/31* (2013.01); *F02D 17/04* (2013.01); *H02J 7/0068* (2013.01); *H02J 7/14* (2013.01)

(58) Field of Classification Search
CPC ... B60R 25/045; B60R 25/104; B60R 25/305; B60R 25/31; F02D 17/04; H02J 7/0068; H02J 7/14
See application file for complete search history.

(56) References Cited

U.S. PATENT DOCUMENTS

| | | | |
|---|---|---|---|
| 6,037,749 A * | 3/2000 | Parsonage | G01R 31/3842 320/132 |
| 9,849,850 B2 | 12/2017 | Iwai | |
| (Continued) | | | |

FOREIGN PATENT DOCUMENTS

| | | |
|---|---|---|
| EP | 1961620 A1 | 8/2008 |
| EP | 3943346 A1 | 1/2022 |
| JP | 2016196759 A | 11/2016 |

OTHER PUBLICATIONS

Written Opinion and International Search Report for Int'l. Patent Appln. No.PCT/EP2023/025176, mailed Aug. 17, 2023 (13 pgs).

*Primary Examiner* — Gertrude Arthur Jeanglaude

(57) ABSTRACT

A machine may comprise a security monitoring system and an engine start/stop system (ESS) where the security monitoring system is configured to detect an object proximate to the machine and classify characteristics of the object and the ESS is configured to turn on an engine of the machine based at least in part on the characteristics of the object. The machine may further comprise a battery to supply power for operation of the security monitoring system and a charging system to charge the battery while the engine is turned on. The ESS may monitor a charge level of the battery, determine whether the charge level is below a preselected threshold start level, and in response to determining that the charge level is below the preselected threshold start level, turn on the engine based at least in part on the characteristics of the object.

16 Claims, 5 Drawing Sheets

(56) References Cited

U.S. PATENT DOCUMENTS

| | | |
|---|---|---|
| 10,144,390 B1 | 12/2018 | Chaston et al. |
| 10,196,791 B1* | 2/2019 | Oetken ................ E02F 9/2037 |
| 10,363,796 B2 | 7/2019 | DeCia et al. |
| 10,378,919 B2 | 8/2019 | DeCia et al. |
| 10,597,024 B2* | 3/2020 | Khafagy ............... B60W 20/13 |
| 2016/0129883 A1 | 5/2016 | Penilla et al. |
| 2017/0297581 A1* | 10/2017 | Hatfield .................. G05B 9/02 |
| 2019/0237987 A1 | 8/2019 | Martell et al. |
| 2020/0399863 A1 | 12/2020 | Aizawa et al. |

* cited by examiner

SYSTEM AND METHOD FOR MAINTAINING A POWER SOURCE FOR CONTINUOUS MACHINE SECURITY MONITORING

TECHNICAL FIELD

The present disclosure relates to a system and method for maintaining a power source for continuous machine security monitoring, and more particularly, to a system and method for safely maintaining a power source based on detected objects via a machine security monitoring system for continuous machine security monitoring.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. Machines, when not in use, are often left unattended on job sites over night or until a need arises, and are at risk of parts being stolen off the machines. Some machines may include a system for monitoring a surrounding area of the machine while the machine is not in use, such as monitoring whether a suspicious person has been detected near the machine outside of the work hours. However, such systems depend on power provided by an internal battery of the machine to operate, and a continuous monitoring of the surrounding of the machine is limited by a capacity, or a remaining capacity, of the internal battery.

U.S. Patent Publication No. 20200399863A1 by Aizawa et al. ("the '863 publication"), published Dec. 24, 2020, describes a system and method for acquiring information relating to a status of a surrounding area of the work machine, transmitting the information, which may be acquired by the sensor or generated based on the information acquired by the sensor, to an external apparatus, and activating a monitoring unit including the sensor and the transmitting unit while the work machine is stopped. Specifically, the '863 publication describes a system and method for determining whether the site monitor function can be activated for a certain period of time based on a remaining capacity of a battery by comparing the remaining capacity to a threshold value.

Although the '863 publication describes activating or deactivating the site monitor function based on the threshold value of the remaining capacity of the battery of the machine, the system described in the '863 publication is not configured to safely enable the site monitor function when the threshold value is reached based at least in part on detected objects in the surrounding area of the machine. As a result, operation of the site monitor function of the '863 publication cannot be maintained as the battery becomes depleted and the remaining capacity reaches below the threshold value.

The systems and methods described herein may be directed to addressing one or more of the possible concerns set forth above.

SUMMARY

According to a first aspect, a system may include a security monitoring system and an engine start/stop system (ESS) configured to maintain a power source of the machine for continuous machine security monitoring. The security monitoring system may include a sensor and/or detector configured to detect an object near a machine and classify characteristics of the object with a type and location. When a charge level of a battery of the machine, supplying power to the security monitoring system, falls below a preselected threshold low level, the ESS may turn on an engine of the machine, enabling a charging system to charge the battery if the characteristics of the object indicate it is safe to turn on the engine. After the engine is turned on, the ESS may turn off the engine in response the charge level reaching a preselected threshold high level. The system may further include a warning mechanism configured to generate a warning in response detecting an object and classifying the object as a human located within a warning area. The machine may further include an engine status monitor configured to monitor a plurality of components associated with the engine and to enable or disable the ESS from starting the engine based on status of the plurality of component.

According to another aspect, a method for maintaining a power source of a machine for continuous machine security monitoring may include detecting an object proximate to a machine, classifying characteristics of the object, and turning on an engine of the machine based at least in part on the characteristics of the object in response to determining that a charge level of a battery of the machine has fallen below a preselected threshold low level.

According to yet another aspect, a machine may include a frame, and a security monitoring system and an engine start/stop system (ESS) mounted to the frame and configured to maintain a power source of the machine for continuous machine security monitoring. The security monitoring system may include a sensor and/or detector mounted to the frame and configured to detect an object near the machine and classify characteristics of the object with a type and location. The machine may additionally include an engine and battery mounted to the frame. When a charge level of the battery, which supplies power to the security monitoring system, falls below a preselected threshold low level, the ESS may turn on the engine to charge the battery if the characteristics of the object indicate it is safe to turn on the engine. After the engine is turned on, the ESS may turn off the engine in response the charge level reaching a preselected threshold high level. The machine may further include a warning mechanism configured to generate a warning in response detecting an object and classifying the object as a human located within a warning area. The machine may further include an engine status monitor configured to monitor a plurality of components associated with the engine and to enable or disable the ESS from starting the engine based on status of the plurality of component.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for safely maintaining a power source for a security monitoring system performing continuous security monitoring of a machine. As will be described below, in some examples, an engine start/stop system (ESS) may automatically turn on an engine or other power source of the machine, thus enabling a charging system to charge a battery powering the security monitoring system when it is safe to do so based on characteristics of the object(s) near the machine detected by the security monitoring system. In some examples, even when the battery needs to be charged, the ESS may refrain from turning on the engine to charge the battery if the characteristics of the object(s) detected by the security monitoring system indicate that it is not safe to start the engine. In some example, after safely turning on the engine, the ESS may turn off the engine if the characteristics of the object(s) change to indicate it is no longer safe to continue running the engine. In some examples, the machine may be tethered to an external power source, such as an external generator and/or a powerline, and the ESS may automatically enable the external source to charge the battery when it is safe to do so.

Figure 1:
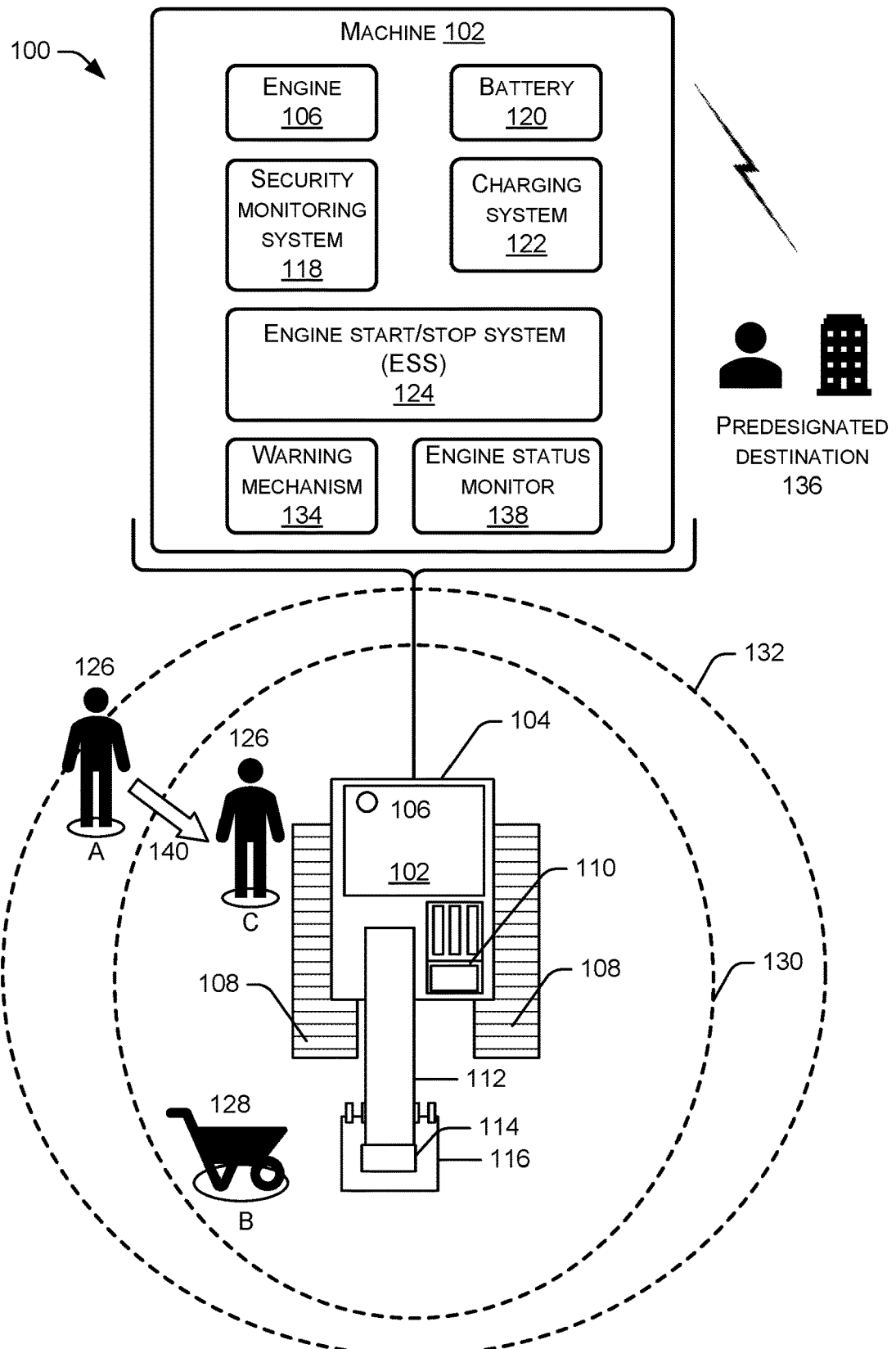
FIG. 1 illustrates a block diagram depicting a schematic top view of an example environment including an example machine including example components and systems for safely maintain a power source for continuous machine security monitoring.

FIG. 1 is a block diagram depicting a schematic top view of an example environment, such as a worksite 100 where an example machine 102 may be stored when not in use. The example machine 102 shown in FIG. 1 is an excavator. However, the machine 102 may be any type of machine configured to travel across terrain, such as an automobile, a truck, an agricultural vehicle, and/or work vehicles, such as a wheel loader, a track loader, a skid-steer loader, a grader, an on-highway truck, an off-highway truck, and/or any other machine known to a person skilled in the art.

The machine 102 includes a chassis or frame 104 to which a power source (e.g., engine 106) is attached. The engine 106 is configured to supply power for operation of the machine 102, including, for example, operating work implements, electronics, and steering, and/or for supplying torque to drive members to propel or move the machine 102 across the terrain. For example, the machine 102 shown in FIG. 1 includes a pair of tracks 108 that are configured to propel the machine 102 across pavement, gravel, dirt, or other work surfaces of the worksite 100. Although the machine 102 includes tracks, it is contemplated that the machine 102 may include one or more wheels instead of, or in addition to, the tracks. The machine 102 also includes a cab 110 operationally connected to the frame 104 for protecting and/or providing comfort for an operator of the machine 102, and/or for protecting control-related devices of the machine 102. In some examples, the machine 102 may be semi-autonomous or fully autonomous, and able to operate without an onboard or remote operator as with remote control operations.

In the example shown in FIG. 1, the machine 102 has a boom 112 with a proximal end operationally connected to the frame 104 and configured to pivot relative to the frame 104. The machine 102 also includes a stick 114 operationally connected to a distal end of boom 112 and configured to pivot relative to the boom 112. The machine 102 further includes a boom actuator coupled at one end to the frame 104 and at an opposite end to the boom 112. The boom actuator is configured to extend and retract, thereby raising and lowering the distal end of the boom 112, respectively. The machine 102 also includes a work implement 116 for performing operations associated with the machine 102, such as digging, carrying, raising, and/or depositing material. The machine 102 includes a work implement actuator coupled at one end to the frame 104 and/or to the proximal end of the boom 112. The work implement actuator is configured to extend and retract, thereby pivoting the work implement 116 between an upright orientation and an at least partially inverted orientation, for example. In the upright orientation, the work implement 116 may hold material and in the at least partially inverted orientation, the work implement 116 may deposit or dump the material. Other forms of work implements are contemplated. For example, although the work implement 116 in FIG. 1 is illustrated as a bucket, the work implement 116 may include augers, brushcutters, brooms, grapples, hammers, pulverizers, rippers, rotors, and so forth.

As shown in FIG. 1, the machine 102 includes the engine 106, a security monitoring system 118, a battery 120, a charging system 122, and an engine start/stop system (ESS) 124, all of which may be amounted, attached, or coupled, to the frame 104. Although FIG. 1 schematically depicts the security monitoring system 118 and the ESS 124 being separate, in some examples, the security monitoring system 118 and the ESS 124 may be embodied within a single system.

The machine 102 may include one or more processors, which may execute any modules, components, or systems associated with the machine 102. In some examples, the processor(s) may include a central processing unit (CPU), a graphics processing unit (GPU), a field programmable gate array (FPGA), any combination of CPU, GPU, and FPGA, or other processing units or components known in the art. Additionally, each of the processors may possess its own local memory, which also may store program modules, program data, and/or one or more operating systems.

Computer-readable media associated with the machine 102 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the security monitoring system 118, the charging system, and/or the ESS 124. In some examples, one or more of the modules may include or be associated with computer-executable instructions that are stored by the computer-readable media and that are executable by one or more processors to perform such operations. The security monitoring system 118, the charging system 122, and the ESS 124 may also include additional components not listed above that may perform any function associated with The security monitoring system 118, the charging system 122, and/or the ESS 124, respectively. The security monitoring system 118, the charging system 122, and/or the ESS 124 may communicate with one another using any known wired and/or wireless communication protocols and/or networks.

As discussed above, a machine, such as the machine 102, is used to perform variety of tasks at a worksite, such as the worksite 100, but when not in use, is often left unattended on the worksite over night or until a need arises, and is at risk of parts being stolen off the machine. When the machine 102 is turned off, the ESS 124 may be activated automatically or manually. The security monitoring system 118 of the machine 102 may also be activated automatically or manually in response to the machine 102 being turned off, and detect objects proximate to the machine 102 and classify characteristics of the objects. Additionally, the security monitoring system 118 may be active also while the machine 102 is in use. Because the machine 102 is turned off, the security monitoring system 118 is powered by the battery 120 of the machine 102, and the operation of the security monitoring system 118 may be limited by the capacity, or the remaining capacity at the time when the machine was turned off, of the battery 120. Depending on the capability or the computational load of the security monitoring system 118, including classification of the detected objects, analysis and processing of the data, data storage, data transmission and reception, etc., the operation time of the security monitoring system 118 becomes shorter as the capability of the security monitoring system 118 increases if the security monitoring system is supported only by the battery 120. The charging system 122, generally comprising an alternator and a voltage regulator (not shown), is configured to charge the battery 120 while the engine 106 is turned on. The engine 106, while turned on, or running, enables the charging system 122 to charge the battery 120. However, as described above, the machine 102 has been turned off, i.e., the engine 106 is not running, for the day and left unattended at the worksite 100. It is not desirable, or feasible, to monitor the battery charge level of the battery 120 in person and manually turn on the engine 106 whenever the battery charge level falls below some lower level, then manually turn off the engine 106 whenever the battery level reaches some high level.

To address the issue above, the engine start/stop system (ESS) 124 may be utilized. The ESS 124 may be operationally connected to the security monitoring system 118, the battery 120, and the engine 106. The ESS 124 may be activated when the machine 102 is placed in an inactive state, or turned off, and the security monitoring system 118 is activated. As described above, the security monitoring system 118 may be automatically activated in response to the machine 102 being turned off or be manually activated after the machine 102 is turned off. The ESS 124 may monitor a charge level of the battery 120 and determine whether the charge level has fallen below a preselected threshold start level, such as a preselected low voltage and/or a preselected low battery capacity value. In response to determining that the charge level has fallen below the preselected threshold start level, the ESS 124 may turn on the engine 106 based at least in part on the characteristics of the object, which have been classified by the security monitoring system 118.

The security monitoring system 118 may classify the characteristics of the detected object based on a type of the object and a location of the object relative to the machine 102 or relative to a specific part of the machine 102. The security system 118 may comprise camera(s), which may be any known type of analogue or digital image sensor, digital camera, and/or digital video camera including a high dynamic range (HDR) camera, a light-sensitive camera, and/or a monocular or stereo camera, and may provide two-dimensional image data, three-dimensional image data, image sequences, gray image data, color image data, depth data, absorption data, and/or reflectance data. The security monitoring system 118 may, in addition to or alternatively, comprise other suitable types of imager(s) and/or sensor(s), such as one or more light detection and ranging (LIDAR) sensors, one or more sound navigation ranging (SONAR) sensors, one or more radio detection and ranging (RADAR) sensors, ultra-sonic sensors, or any other suitable sensor type.

Two objects 126 and 128 are illustrated in FIG. 1. In this example, the security monitoring system 118 may classify the characteristics the object 126 as a human and the object 128, which is a wheelbarrow, as a non-human object. The security monitoring system 118 may also determine the location information associated with the objects 126 and 128, and may classify the characteristics of the object 126 (human) as located more than a preselected distance from the machine 102, shown as Position A outside of an predefined area 130 around the machine 102 but within a warning area 132, and the characteristics of the object 128 (wheelbarrow) as located less than or equal to the preselected distance from the machine 102, shown as Position B. The predefined area 130 may be an area defined by the preselected distance from the machine 102 outside of which is considered safe for people to be present when turning on the engine 106. The predefined area 130 and the warning area 132 may also be the same and cover the same area. In addition, or alternatively, some components of the machine 102 may have their own unique preselected distances for safety. For example, the preselected distance may be 1 m from the counterweight of the machine 102, 2 m from the compartment doors, 5 m from the access panel for hydraulics of the machine 102 to avoid potential exposure to hydraulic fluid in case of leakage, 10 m from the front of the machine to monitor the extended linkage and attachments, etc.

The machine 102 may further comprise a warning mechanism 134 operationally connected to the security monitoring system 118. The security monitoring system 118 may be further configured to activate the warning mechanism 134 and generate a warning in response to classifying the characteristics of the object 126 as a human located at a location less than or equal to a preselected distance for the warning area 132 from the machine. The warning may comprise at capturing and storing an image of the object 126, time-stamping the image, transmitting the image to a predesignated destination 136, such as an owner of the machine 102, a user of the machine 102, and/or a central office responsible for the machine 102 and/or the worksite 100, transmitting a notice to the predesignated destination, and/or activating at least one of a visual warning or an audio warning at the machine, such as sounding an alarm and/or flashing lights.

In this example shown in FIG. 1, the ESS 124 may turn on the engine 106 because the security monitoring system 118 has classified the characteristics of the object 126 as a human but located further than the preselected distance from the machine 102, being outside of the predefined area 130, and classified the characteristics of the object 128, while located within the predefined area 130, as a non-human (wheelbarrow). In general, the ESS 124 may turn on the engine 106 when the security monitoring system 118 has classified the characteristics of an object to be 1) non-human, or 2) outside of the predefined area 130, or the preselected distance away from the machine 102. After turning on the engine 106, the ESS 124 may turn off the engine 106 in response to determining that the charge level of the battery 120 has reached a preselected threshold stop level, such as a preselected high voltage and/or a preselected high battery capacity value. The preselected threshold stop level is higher than the preselected threshold start level.

The machine 102 may additionally comprise an engine status monitor 138 operationally connected to the ESS 124 and configured to monitor a plurality of components associated with the engine 106, such as an oil level, a coolant level, a fuel level, a previous engine turn off procedure, etc. Additionally, the engine status monitor may be configured to monitor a parking brake of the machine 102 so that the machine 102 is prevented from moving when the engine 106 is turned on. The engine status monitor 138 may determine the status, or condition, of each component of the plurality of components. The engine status monitor 138 may enable the ESS 124 to turn on the engine 106 only in response to determining the status of each component of the plurality of components to be in a satisfactory status, which may be indicated by passing a status check. The ESS 124 may, after turning on the engine 106, turn off, or cause the ESS 124 to turn off, the engine 106 in response to determining status of one or more components of the plurality of components has changed to non-satisfactory, such as the oil level being, or becoming, too low, which may be indicated by failing the status check. The engine status monitor 138 may also disable the ESS 124 from turning on the engine 106 in response to determining the status of the one or more components of the plurality of components to be non-satisfactory.

After turning on the engine 106, the ESS 124 may turn off the engine 106 in response to the security monitoring system 118 newly classifying the object 126 to be a human and located less than or equal to the preselected distance from the machine 102, shown as Position C inside of the predefined area 130. This change may be due the object 126 previously classified as a human located at Position A has moved to Position C as indicated by an arrow 140. In this example, because there is a person close enough to the machine 102, the worksite 100 is now considered unsafe, that is, potentially hazardous for the person, to continue running the engine 106. Although the charge level of the battery 120 may indicate that the battery has not reached the preselected threshold stop level and still needs to be charge, the safety concern for the person may override the need to charge the battery 120 for continuous monitoring by the security monitoring system 118. After turning off the engine 106, the ESS 124 may turn the engine 106 back on in response to the security monitoring system 118 classifying the object 126 to have moved out of the predefined area 130.

Figure 2:
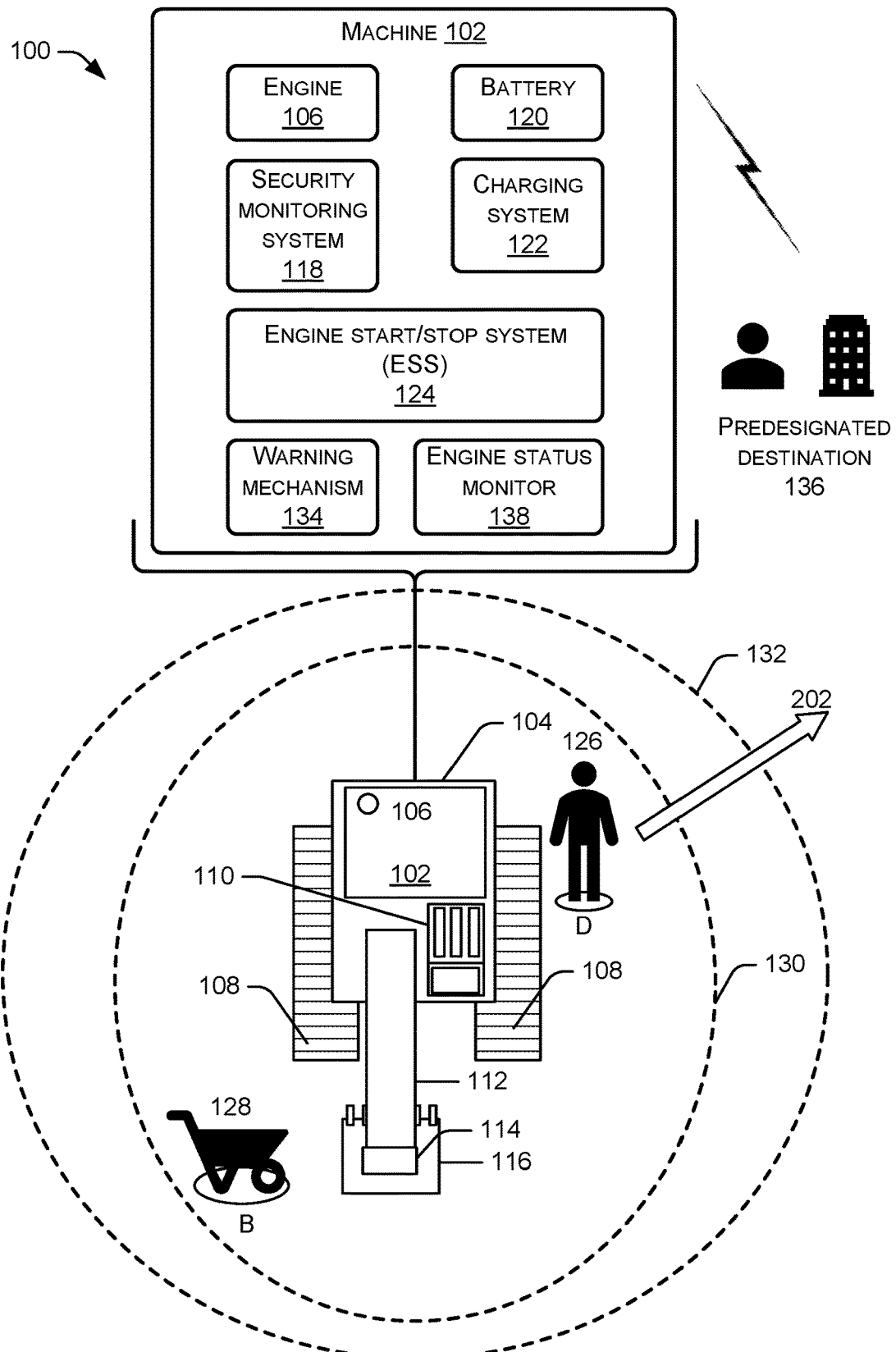
FIG. 2 illustrates a block diagram depicting another schematic top view of the example environment.

FIG. 2 is a block diagram depicting another schematic top view of an example environment 200. The example environment 200 is similar to the worksite 100 of FIG. 1 except that the object 126 is now shown to be within the predefined area 130 at position D, that is, the security monitoring system 118 has classified the characteristics of the object 126 as a human located at a location less than or equal to the preselected distance from the machine 102. For example, The ESS 124 may refrain from turning on the engine 106 to avoid causing harm to service personnel or others who are authorized to service the machine 102 even when the ESS 124 determines that the charge level of the battery 120 is below the preselected threshold start level. However, sometime later if the object moves as indicated by an arrow 202 and the security monitoring system 118 continues to classify the characteristics of the object 126 as a human but now located outside of the predefined area 130, the ESS 124 may turn on the engine 106.

Figure 3:
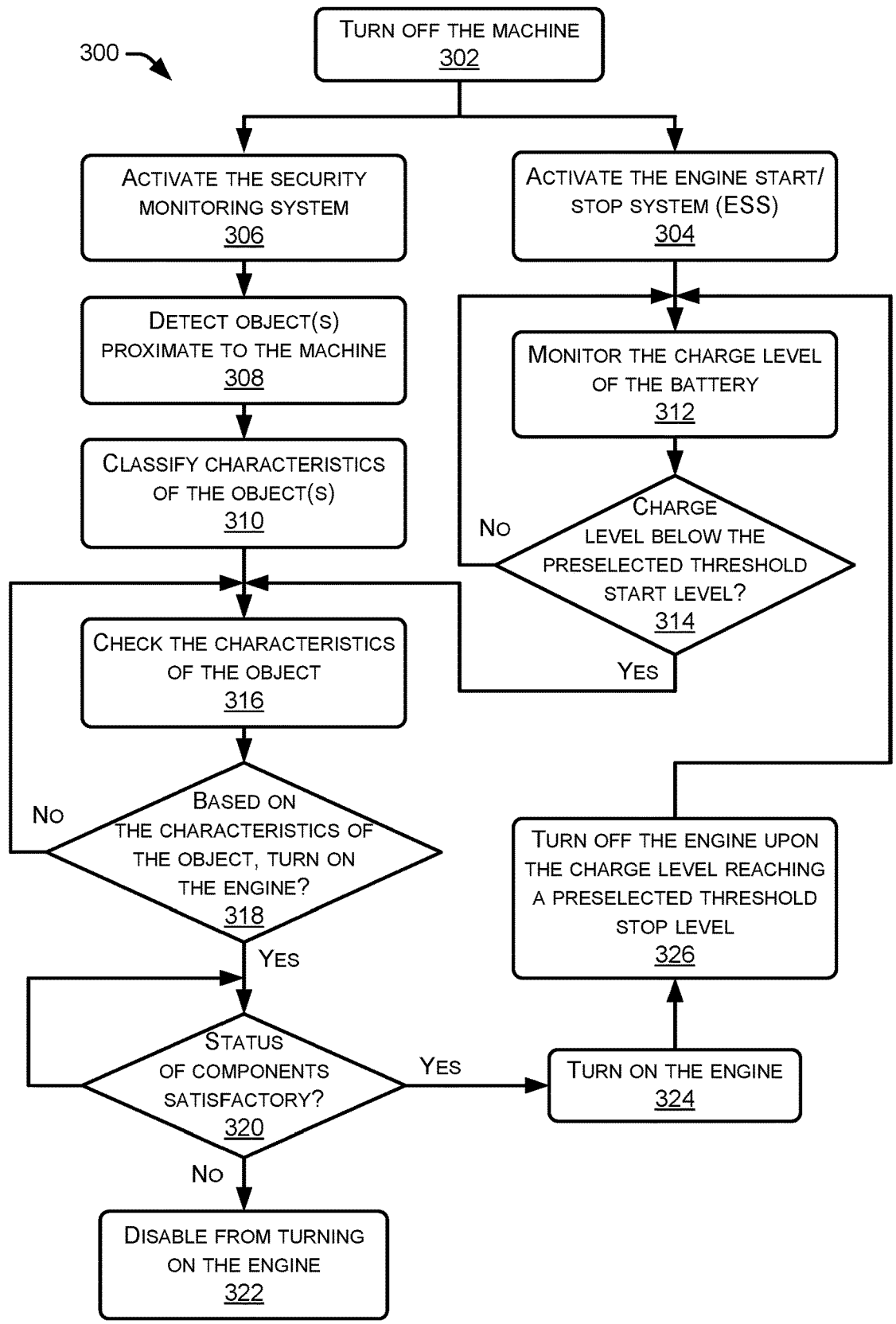
FIG. 3 provides a flow chart representing an example process for safely maintaining a power source for continuous machine security monitoring in an example environment.

FIG. 3 illustrates an example process 300 for safely maintaining a power source for continuous machine security monitoring in an example environment, such as a worksite. This process 300 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process. The example process 300 illustrated in FIG. 3 may be applicable for use for a machine in a worksite as described above with reference to FIGS. 1 and 2.

As discussed above, a machine, such as the machine 102, is used to perform variety of tasks at a worksite, but when not in use, is often left unattended on the worksite over night or until a need arises, and is at risk of parts being stolen off the machine. At block 302, the machine 102 may be placed in an inactive state (turned off), for example, by turning off a key, or dial, switch, and at block 304, the engine start/stop system (ESS) 124 of the machine 102 may be activated automatically or manually in response to the machine 102 being turned off. At block 306, the security monitoring system 118 may be activated automatically or manually in response to the machine 102 turned off. While activating the ESS 124 and the security monitoring system 118 are shown as separate blocks 304 and 306, in some examples, the ESS 124 and the security monitoring system 118 may be activated at the same time in response to the machine 102 being turned off at block 302.

At block 308, the security monitoring system 118 may monitor the surrounding of the machine 102 and detect objects proximate to the machine 102, and at block 310, classify characteristics of the detected objects. The security monitoring system 118 may classify the characteristics of the detected object based on a type of the object and a location of the object relative to the machine 102 or relative to a specific part of the machine 102. The security system 118 may comprise camera(s), which may be any known type of analogue or digital image sensor, digital camera, and/or digital video camera including a high dynamic range (HDR) camera, a light sensitive camera, and/or an ultra-sonic camera, and may provide two-dimensional image data, three dimensional image data, image sequences, gray image data, color image data, depth data, absorption data, and/or reflectance data. The security monitoring system 118 may, in addition to or alternatively, comprise other suitable types of imager(s) and/or sensor(s), such as one or more light detection and ranging (LIDAR) sensors, one or more sound navigation ranging (SONAR) sensors, one or more radio detection and ranging (RADAR) sensors, or any other suitable sensor type.

Because the machine 102 is turned off, the security monitoring system 118 is powered by the battery 120 of the machine 102, and the operation of the security monitoring system 118 may be limited by the capacity, or the remaining capacity at the time when the machine was turned off, of the battery 120. Depending on the capability or the computational load of the security monitoring system 118, including classification of the detected objects, analysis and processing of the data, data storage, data transmission and reception, etc., the operation time of the security monitoring system 118 becomes shorter as the capability of the security monitoring system 118 increases if the security monitoring system is supported only by the battery 120. At block 312, the ESS 124, upon activation, may begin continuously monitoring a charge level of the battery 120, and at block 314, determine whether the charge level has fallen below a preselected threshold start level, such as a preselected low voltage and/or a preselected low battery capacity value. If the charge level has not fallen below the preselected threshold start level, the ESS 124 may continue monitoring the charge level of the battery 120 at block 312.

In response to determining that the charge level has fallen below the preselected threshold start level, the ESS 124 may check the characteristics of the object classified by the security monitoring system 118 at block 316, and determine whether to turn on the engine 106 based at least in part on the characteristics at block 318. If the ESS 124 determines that the characteristics of the object do not meet the certain conditions (the "NO" branch) at block 318, the process may loop back to block 316, for example after a preselected interval, such as five seconds, for the ESS 124 to check the characteristics of the object, which may have been updated. If the ESS 124 determines that the characteristics of the object meet certain conditions (the "YES" branch), then the engine status monitor 138 may check the status, or condition, of a plurality of components associated with the engine 106, such as an oil level, a coolant level, a fuel level, a previous engine turn off procedure, the parking brake of the machine 102, etc., and determine whether the status of each component of the plurality of components to be in a satisfactory status at block 320. If the status is not satisfactory (the "NO" branch), which may be indicated by failing a status check, then the engine status monitor 138 may disable the ESS 124 from turning on the engine 106 at block 322. If the status is satisfactory (the "Yes" branch"), which may be indicated by passing the status check, then the engine status monitor 138 may enable the ESS 124 to turn on the engine 106 and the ESS may turn on the engine at block 324, thus running the charging system 122 to charge the battery 120. The engine status monitor 138 may continue monitoring the status, after the engine 106 is tuned on, may turn off, or cause the ESS 124 to turn off, the engine 106 in response to determining status of one or more components of the plurality of components has changed to non-satisfactory, such as the oil level being, or becoming, too low. The ESS 124 may then turn off the engine 106 at block 326 in response to determining that the charge level of the battery 120 has reached the preselected threshold hold based on the continuously monitoring of the charge level of the battery 120, such as a preselected high voltage and/or a preselected high battery capacity value. The preselected threshold stop level is higher than the preselected threshold start level. The process may then loop back to block 312 and continue monitoring the charge level of the battery 120.

Figure 4:
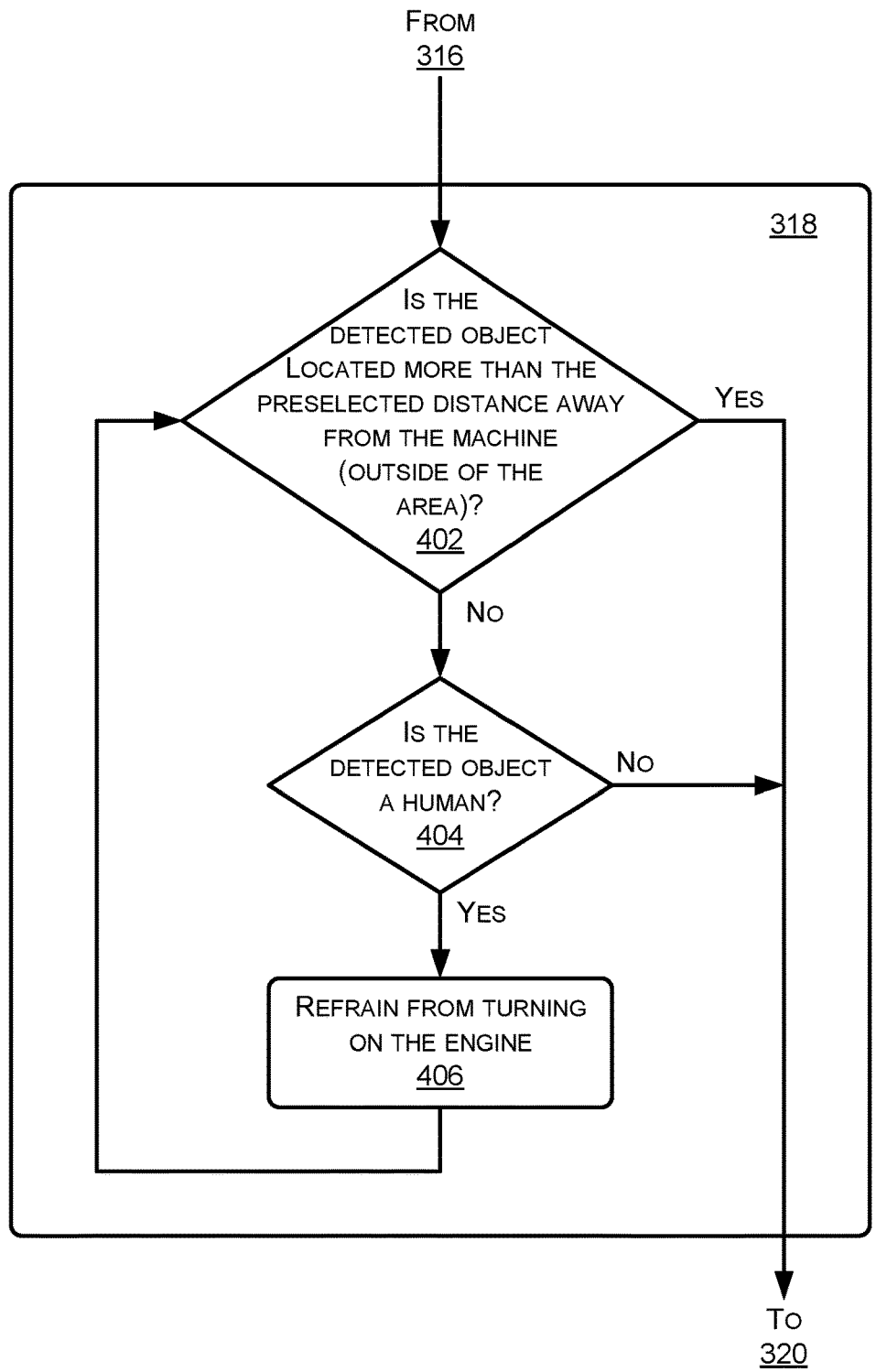
FIG. 4 provides another flow chart representing an example detail process of one of the blocks of FIG. 3.

FIG. 4 illustrates an example detail process of block 318 of FIG. 3 for analyzing the characteristics of the detected object.

As discussed above with reference to FIG. 1, the security monitoring system 118 may, at block 310 classify the characteristics of the detected object based on the type of the object and the location of the object relative to the machine 102. At block 402, the ESS 124 may, based on the characteristics of the object, determine whether the detected object is located more than a preselected distance from the machine 102. As discussed above with reference to FIG. 1, the predefined area 130 may be an area defined by the preselected distance from the machine 102 outside of which is considered safe for people to be present when turning on the engine 106. If the object is determined to be located more than a preselected distance (the "YES" branch), then the process may proceed to block 320. However, if the object is determined not to be located more than a preselected distance, i.e., within the predefined area 130 (the "No" branch), then the ESS 124 may determine whether the object is a human at block 404. If the object is determined to be a human (the "YES" branch), such as the object 126 at the Position C in FIG. 1, then the ESS 124 may refrain from turn on the engine at block 406. The process may then loop back to block 402 to determine the location of the object, for example, if the object has moved to the outside of the predefined area 130. However, if the object is determined to not be a human (the "NO" branch), such as the object 128 (wheelbarrow) at the Position B in FIG. 1, then the process may proceed to block 320.

Figure 5:
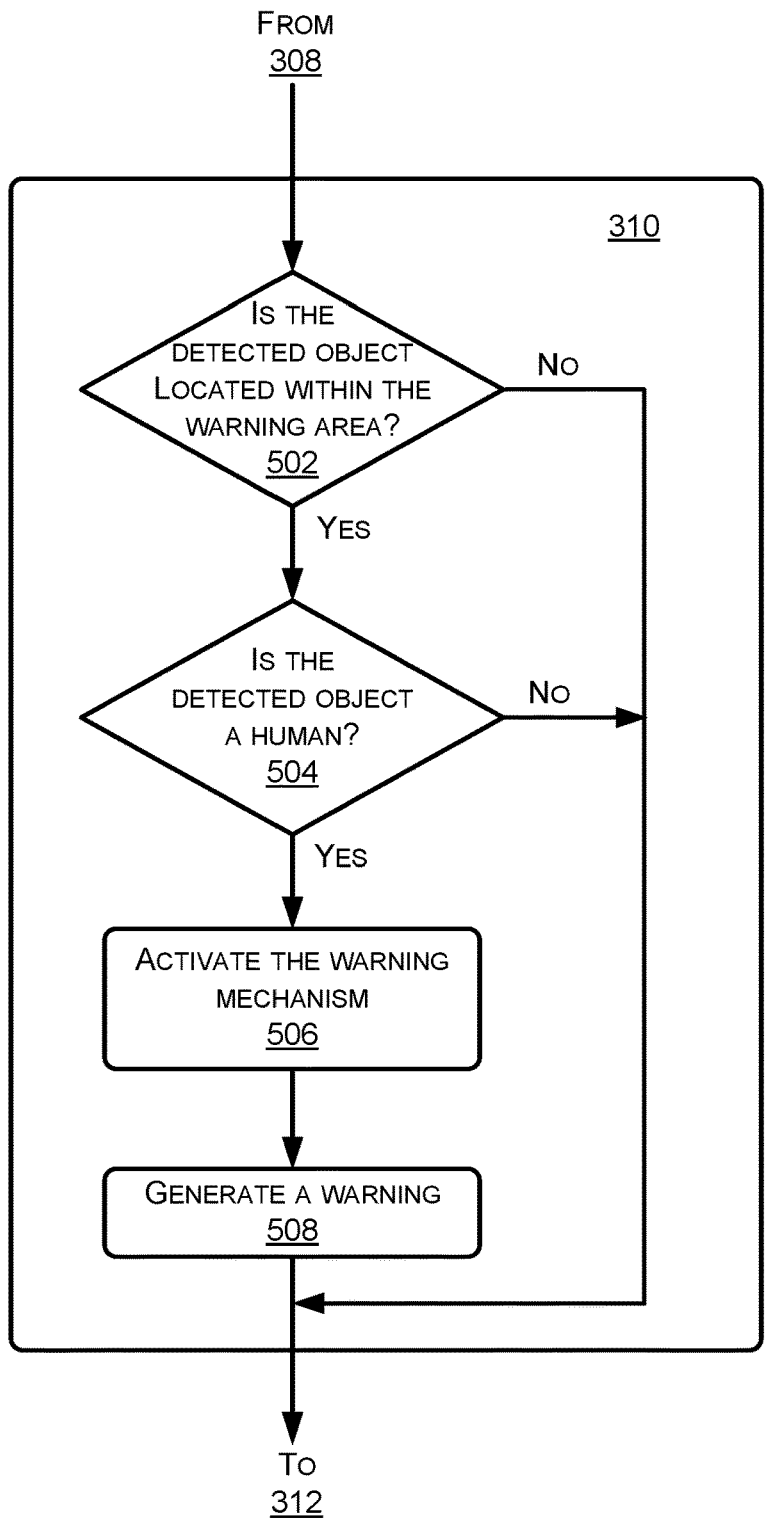
FIG. 5 provides a further flow chart representing an example detail process of another block of FIG. 3.

FIG. 5 illustrates an example detail process of block 310 of FIG. 3 for generating a warning based on the classified characteristics of the detected object.

The machine 102 may further comprise a warning mechanism 134 operationally connected to the security monitoring system 118. As discussed above with reference to FIG. 1, the security monitoring system 118 may, at block 310 classify the characteristics of the detected object based on the type of the object and the location of the object relative to the machine 102. At block 502, the security monitoring system 118 may determine whether the detected object is located within the warning area 132. The predefined area 130 and the warning area 132, as shown in FIG. 1, may also be the same and cover the same area. In addition, or alternatively, some components of the machine 102 may have their own unique preselected distances for safety. For example, the preselected distance may be 1 m from the counterweigh of the machine 102, 2 m from the compartment doors, 5 m from the access panel for hydraulics of the machine 102 to avoid potential exposure to hydraulic fluid in case of leakage, 10 m from the front of the machine to monitor the extended linkage and attachments, etc. If the object is determined to be outside of the warning area 132 (the "NO" branch), no warning is generated and the process proceeds to block 312. However, the object is determined to be within the warning area 132 (the "YES" branch), the security monitoring system 118 may determine whether the object is a human at block 504. If the object is determined not to be a human (the "NO" branch), no warning is generated and the process proceeds to block 312. If the object is determined to be a human (the "YES" branch), the security monitoring system 118 may be activate the warning mechanism 134 at block 506, which may then generate a warning at block 508. The warning may comprise at capturing and storing an image of the object 126, time-stamping the image, transmitting the image to a predesignated destination 136, such as an owner of the machine 102, a user of the machine 102, and/or a central office responsible for the machine 102 and/or the worksite 100, transmitting a notice to the predesignated destination, and/or activating at least one of a visual warning or an audio warning at the machine, such as sounding an alarm and/or flashing lights. After generating a warning, the process may proceed to block 312.

Industrial Applicability

The example systems and methods of the present disclosure are applicable to a variety of machines, such as, for example, an automobile, marine vehicles, a truck, an agricultural vehicle, a paving machine, a mining machine, and/or construction vehicles. The systems and methods described herein may be used in association with storage of such machines at a worksite. For example, a security monitoring system and an engine start/stop system (ESS) of the machine may be automatically, or manually, activated when the machine is turned off. The machine may additionally include an engine, a battery, and a charging system operationally connected to the security monitoring system and/the ESS, for example, according to the examples described herein. In some examples of the systems and methods, the security monitoring system, powered by the battery, may detect an object proximate to the machine, and classify characteristics of the object, such as whether the object is a human and the location of the object relative to the machine, and the ESS may monitor a charge level of the battery, determine whether the charge level is below a preselected threshold start level, and in response to determining that the charge level is below the preselected threshold start level, turn on the engine based at least in part on the characteristics of the object, and charge the battery by the charging system, thereby allowing continued operation of the security monitoring system.

For example, the machine, when not in use, may be left unattended at a worksite such as a landfill, construction site, or mining site, and may be at risk of parts being stolen off the machine. At some such worksites, the security monitoring system of the machine may be activated to continuously monitor the surrounding of the machine. However, because the machine is not active, the security monitoring system is only powered by the battery and operation time of the security monitoring system is limited by the capacity of the battery. In some examples, the ESS may turn on the engine to charge the battery if it is safe to do so based at least in part on the characteristics of the object classified by the security monitoring system, that is, the characteristics of the object classified as located at a location more than a preselected distance away from the machine indicating the object is outside of a predefined area, or the characteristics of the object classified as non-human, such as a wheelbarrow, a container, another machine, etc. In some examples, the ESS may refrain from turning on the engine if the characteristics of the object are classified as a human located at a location less than or equal to the preselected distance from the machine indicating the there is a human within the predefined area and too close to safely start the engine.

In some examples, the ESS may turn off the engine when the charge level reaches a preselected threshold stop level, or in response to the security monitoring system detecting a human now too close to the machine for safe running of the engine by classifying the object to be a human and located at a location less than or equal to the preselected distance from the machine.

In some examples, the machine may additionally include an engine status monitor configured to monitor a plurality of components associated with the engine, such an oil level, a coolant level, a fuel level, a previous engine turn off procedure, etc. The engine status monitor may determine whether the engine is in an operational condition by checking or determining a corresponding status of each component of the plurality of components, and enable the ESS to turn on the engine if each component of the plurality of components is in a satisfactory status. The engine status monitor may turn off, or cause the ESS to turn off, the engine in response to determining the status of one or more components of the plurality of components becoming non-satisfactory status, or disable the ESS from turning on the engine in response to determining the status one or more components of the plurality of components to be in the non-satisfactory status.

In some examples, the security monitoring system may also activate a warning in response to classifying the characteristics of the object as a human entering a warning area defined by a preselected warning distance from the machine, which may, or may not, be the same as the predefined area. The warning may comprise capturing and storing an image of the object, time-stamping the image, transmitting the image to a predesignated destination, such as the owner/user of the machine and/or the central office responsible for the machine/worksite, transmitting a notice to the predesignated destination, and/or activating at least one of a visual warning, such as flashing lights or an audio warning, such as an alarm or a horn of the machine 102, at the machine.

In some examples, the systems and methods described herein may provide additional benefit of providing a longer battery life by preventing a need for a deep-cycle charging of the battery.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A system comprising:
    a security monitoring system configured to:
        detect an object proximate to a machine; and
        classify characteristics of the object;
    a battery operationally connected to the security monitoring system, the battery configured to supply power for operation of the security monitoring system;
    a charging system operationally connected to the battery, the charging system configured to charge the battery;
    an engine operationally connected to the charging system, the engine configured to enable the charging system to charge the battery while the engine is turned on; and
    an engine start/stop system (ESS) operationally connected to the security monitoring system, the battery, and the engine, the ESS configured to:
        determine that a charge level of the battery is below a preselected threshold start level; and
        based at least in part on the characteristics of the object and on determining that the charge level is below the preselected threshold start level, turn on the engine, wherein turning on the engine based at least in part on the characteristics of the object comprises:
            the security monitoring system classifying the characteristics of the object as, at least one of:
                located at a location more than a preselected distance away from the machine; or
                a non-human; and
        after turning on the engine, the ESS is further configured to:
            turn off the engine in response to determining that the charge level has reached a preselected threshold stop level.

2. The system of claim 1, wherein the ESS is further configured to:
    be activated in response to the machine being placed in an inactive state and the security monitoring system being activated.

3. The system of claim 1, wherein the security monitoring system is further configured to:
    activate a warning in response to classifying the characteristics of the object as a human located at a location less than or equal to a preselected distance from the machine.

4. The system of claim 3, wherein the warning comprises at least one of:
capturing and storing an image of the object, time-stamping the image;
transmitting the image to a predesignated destination;
transmitting a notice to the predesignated destination; or
activating at least one of a visual warning or an audio warning at the machine.

5. The system of claim 1, wherein the ESS is further configured to:
in response to determining that the charge level is below the preselected threshold start level, refrain from turning on the engine in response to the security monitoring system classifying the characteristics of the object as a human located at a location less than or equal to the preselected distance from the machine.

6. The system of claim 1, wherein, after turning on the engine, the ESS is further configured to:
turn off the engine in response to the security monitoring system classifying the object to be a human and located at a location less than or equal to the preselected distance from the machine.

7. The system of claim 1, further comprising:
an engine status monitor operationally connected to the ESS, the engine status monitor configured to:
determine a respective status of a plurality of components associated with the engine;
enable the ESS to:
turn on the engine in response to determining the status of each component of the plurality of components passing a status check, and
turn off the engine in response to determining the status of one or more components of the plurality of components failing the status check; and
disable the ESS from turning on the engine in response to determining the status of the one or more components of the plurality of components fails the status check.

8. A method comprising:
by a security monitoring system:
detecting an object proximate to a machine; and
classifying characteristics of the object;
supplying, by a battery, power for operation of the security monitoring system;
by an engine start/stop system (ESS):
determining that a charge level of the battery is below a preselected threshold start level;
based at least in part on the characteristics of the object and on determining that the charge level is below the preselected threshold start level, turning on an engine of the machine;
charging, by a charging system enabled by the engine, the battery while the engine is turned on;
determining a respective status of a plurality of components associated with the engine;
in response to determining the status of each component of the plurality of components passing a status check:
turning on the engine, and
turning off the engine in response to determining the status of one or more components of the plurality of components failing the status check after turning on the engine; and
refraining from turning on the engine in response to determining the status of the one or more components of the plurality of components fails the status check.

9. The method of claim 8, further comprising:
activating the ESS in response to the machine being placed in an inactive state and the security monitoring system being activated.

10. The method of claim 8, further comprising:
activating a warning in response to classifying the characteristics of the object as a human located at a location less than or equal to a preselected distance from the machine.

11. The method of claim 10, wherein the warning comprises at least one of:
capturing and storing an image of the object, time-stamping the image;
transmitting the image to a predesignated destination;
transmitting a notice to the predesignated destination; or
activating at least one of a visual warning or an audio warning at the machine.

12. The method of claim 8, wherein turning on the engine based at least in part on the characteristics of the object comprises:
classifying the characteristics of the object as, at least one of:
located at a location more than a preselected distance away from the machine, or
a non-human.

13. The method of claim 12, further comprising:
in response to determining that the charge level is below the preselected threshold start level, refraining from turning on the engine in response to classifying the characteristics of the object as a human located at a location less than or equal to the preselected distance from the machine.

14. The method of claim 12, after turning on the engine, further comprising:
turning off the engine in response to determining that the charge level has reached a preselected threshold stop level.

15. The method of claim 12, after turning on the engine, further comprising:
turning off the engine in response to classifying the object to be a human and located at a location less than or equal to the preselected distance from the machine.

16. A system comprising:
a security monitoring system configured to:
detect an object proximate to a machine; and
classify characteristics of the object;
a battery operationally connected to the security monitoring system, the battery configured to supply power for operation of the security monitoring system;
a charging system operationally connected to the battery, the charging system configured to charge the battery;
an engine operationally connected to the charging system, the engine configured to enable the charging system to charge the battery while the engine is turned on; and
an engine start/stop system (ESS) operationally connected to the security monitoring system, the battery, and the engine, the ESS configured to:
determine that a charge level of the battery is below a preselected threshold start level; and
based at least in part on the characteristics of the object and on determining that the charge level is below the preselected threshold start level, turn on the engine, wherein turning on the engine based at least in part on the characteristics of the object comprises:

the security monitoring system classifying the characteristics of the object as, at least one of:
  located at a location more than a preselected distance away from the machine; or
  a non-human; and
after turning on the engine, the ESS is further configured to:
  turn off the engine in response to the security monitoring system classifying the object to be a human and located at a location less than or equal to the preselected distance from the machine.

\* \* \* \* \*